United States Patent
Murray

[19]

[11] Patent Number: 6,154,644
[45] Date of Patent: Nov. 28, 2000

[54] SYSTEM AND METHOD OF IMPLEMENTING AN INTERACTIVE CALLBACK FEATURE IN A RADIO TELECOMMUNICATIONS NETWORK

[75] Inventor: James R. Murray, Brossard, Canada

[73] Assignee: Telefonaktiebolaget L M Ericsson, Stockholm, Sweden

[21] Appl. No.: 09/149,530

[22] Filed: Sep. 8, 1998

[51] Int. Cl.$^7$ ..................................................... H04Q 7/38
[52] U.S. Cl. .......................................... 455/414; 455/461
[58] Field of Search ..................................... 455/414, 461, 455/417; 379/201, 210, 211, 214, 215

[56] References Cited

U.S. PATENT DOCUMENTS

| | | | |
|---|---|---|---|
| 4,930,152 | 5/1990 | Miller | 379/214 |
| 4,947,421 | 8/1990 | Toy et al. | 379/67 |
| 5,034,975 | 7/1991 | Grimes | 379/67 |
| 5,127,047 | 6/1992 | Bell et al. | 379/100 |
| 5,185,782 | 2/1993 | Srinivasan | 370/214 |
| 5,329,578 | 7/1994 | Brennan et al. | 455/461 |
| 5,406,616 | 4/1995 | Bjorndahl | 379/59 |
| 5,995,848 | 11/1999 | Nguyen | 455/414 |
| 6,014,377 | 1/2000 | Gillespie | 455/461 |

FOREIGN PATENT DOCUMENTS

WO 95/17790  6/1995  WIPO .

OTHER PUBLICATIONS

TR45.4.1/92.091.5.04; "Personal Communications Services Description PN–3034, Revision 0"; pp. 4–1 through 4–10.

*Primary Examiner*—Daniel S. Hunter
*Assistant Examiner*—Myron K. Wyche
*Attorney, Agent, or Firm*—Smith & Danamraj, P.C.

[57] ABSTRACT

A system and method in a radio telecommunications network for interactively providing a calling party with a choice of call handling options when a called mobile station (MS) is either busy or inactive. When a call is received for the called MS in the network, a home location register (HLR) determines the status of the called MS (i.e., whether the called MS is available, inactive, or busy). If the called MS is inactive or busy, the status is sent to a service control point (SCP) which generates a plurality of call handling options based upon the determined status of the called MS. The call handling options are provided to the calling party in an interactive prompting process which may be in the form of a menu display or voice prompting. The calling party then selects a call handling option which is forwarded to the SCP. The calling party may instruct the network to automatically set up a call with the called MS if the called MS is reactivated within a specified period of time. The SCP determines actions required to execute the selected call handling option, and executes the determined actions. Call setup between the calling party and the called MS is triggered when the called MS registers with the network. If the time period expires before the called MS registers, the calling party is notified and may extend the time period or record a voice mail message.

7 Claims, 2 Drawing Sheets

US 6,154,644

SYSTEM AND METHOD OF IMPLEMENTING AN INTERACTIVE CALLBACK FEATURE IN A RADIO TELECOMMUNICATIONS NETWORK

BACKGROUND OF THE INVENTION

1. Technical Field of the Invention

This invention relates to telecommunication systems and, more particularly, to a system and method of implementing an interactive callback feature in a radio telecommunications network.

2. Description of Related Art

In existing telecommunications networks, callback features essentially monitor a busy line and when the line becomes free, a call is initiated to the calling party. For example, in U.S. Pat. No. 5,406,616 to Bjorndahl (Bjorndahl), if a called mobile station (MS) is busy, an indication of this MS status is queued in the calling party's home location register (HLR). When the called MS becomes available, the calling party is notified, and the call is connected. However, Bjorndahl does not address the problem encountered in mobile networks when the delay may be extensive because the called MS is inactive for some reason. For example, the called MS may be turned off, its battery may be dead, the mobile subscriber may have roamed out of the MS's coverage area, or the MS may temporarily be in an area shielded from radio reception. In such cases, Bjorndahl and other existing solutions are limited to noting the calling party that the called party is not available, or automatically routing the call to voice mail, if the called party subscribes to voice mail.

TR45.4.1/92.09.15.04 entitled "Personal Communications Services Description, PN-3034, Revision 0" (PN-3034) discloses call management services which include an automatic callback service which calls back a calling party if a called party is busy, when the called party becomes free. However, PN-3034 does not address the problem encountered in mobile networks when the called MS is inactive for some reason, and the delay may be extensive.

There is no known solution which interactively provides the calling party with a choice of call handling options when the called MS is either busy or inactive.

SUMMARY OF THE INVENTION

In one aspect, the present invention is a method in a radio telecommunications network of interactively providing a calling party with a choice of call handling options when a called mobile station (MS) is either busy or inactive. The method includes the steps of receiving a call for the called MS in the network, determining whether the called MS is busy or inactive, and providing the calling party with a plurality of call handling options. This is followed by the calling party selecting a call handling option from the plurality of call handling options, determining actions required to execute the selected call handling option, and executing the determined actions.

In another aspect, the present invention is a method of interactively providing a calling party with a choice of call handling options when a called MS is either busy or inactive. The method is implemented in a radio telecommunications network having a home location register (HLR) and a service control point (SCP). The method begins by receiving a call for the called MS in the network, and determining in the HLR a status of the called MS, the status indicating whether the called MS is inactive or busy. This is followed by generating in the SCP a plurality of call handling options based upon the determined status of the called MS, and providing the calling party with the plurality of call handling options. The calling party may be provided with a first set of call handling options when the called MS is busy, and a second set of call handling options when the called MS is inactive. The calling party then selects a call handling option instructing the network, for example, to automatically set up a call with the called MS when the called MS is reactivated. This is followed by determining in the SCP actions required to execute the selected call handling option, and executing the determined actions. Call setup is automatically triggered when the called MS registers with the network.

In yet another aspect, the present invention is a similar method to that just described in which the calling party selects a call handling option instructing the network to automatically set up a call with the called MS if the called MS is reactivated before a specified time period expires. This is followed by determining in the SCP actions required to execute the selected call handling option, and executing the determined actions. The SCP starts a timer to determine when the specified time period has expired. The HLR determines that the called MS registered with the network and reports the registration to the SCP. The SCP determines whether the specified time period had expired when the called MS registered, and automatically initiates a call setup between the calling party and the called MS if the called MS registered with the network before the time period expired.

In still another aspect, the present invention is a system in a radio telecommunications network for interactively providing a calling party with a choice of call handling options when a called MS is either busy or inactive. The system includes a MSC which connects the calling party to the network, and a HLR connected to the MSC. The HLR includes a subscriber database which indicates a status of the called MS, means for sending the status of the called MS to a SCP, and means for flagging calls for special call handling treatment. The system also includes a SCP connected to the HLR. The SCP generates a plurality of call handling options in response to receiving the status of the called MS from the HLR, and sends the generated options to the calling party. The SCP determines actions required to execute a call handling option selected by the calling party, and executes the determined actions. The SCP includes a timer for measuring a time period specified by the calling party.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
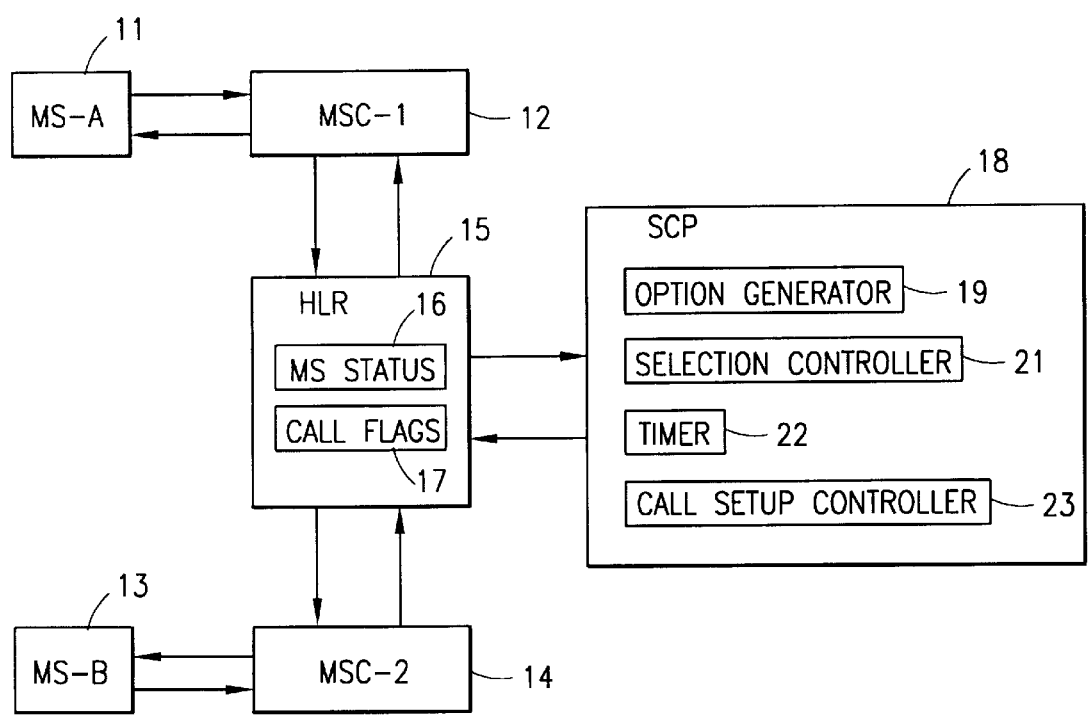
FIG. 1 is a simplified block diagram of a radio telecommunications network that has been modified to implement the system of the present invention.

The callback feature of the present invention interactively provides the calling party with a choice of call handling options when the called MS is either busy or inactive. All existing callback features are based on the assumption that the called party is busy. The features essentially monitor a busy line, and when the line becomes free, a call is initiated to the calling party. However, one way in which a called MS differs from a called fixed line telephone is that, in addition to being busy, the MS can be inactive, or it may have roamed out of range of the network. For example, the MS may be turned off, its battery may be dead, the mobile subscriber may have roamed out of the MS's coverage area, or the MS may temporarily be in an area shielded from radio reception. To the mobile network, all of these situations result in the called MS essentially being "Inactive" for call completion purposes. Existing callback features do not address this situation.

The present invention informs the calling party of the status of the called MS, and interactively provides the calling party with information to decide how to handle the call. The system informs the calling party that the called MS is either engaged in a call (busy), or that the called MS is inactive. Based on this information, the calling party can choose, through an interactive prompting process, a preferred call handling option to reach the called MS. For example, if the called MS is busy, the calling party may be offered the choice to hold, to leave a voice mail message, or to send a Short Message Service (SMS) message to the called MS, etc. By way of further example, if the called MS is inactive, the calling party may be offered different choices such as to be called back when the called MS is reactivated, or to leave a voice mail message. If the call is urgent, the calling party may instruct the system to inform him if the called MS becomes active again within a specified time period, for example 30 minutes.

After the specified time period, if the called MS is not active, the system may inform the calling party of this fact and provide the option at that time to continue with another time period or leave a voice mail message. If the called MS registers with the network before the time period expires, then the system takes action to handle the call based on the settings that have been set by the calling party through the interactive prompting. The term "interactive prompting" means any interactive process by which the system informs the calling party of the status of the called MS, requests the calling party to input a preferred selection regarding the handling of the call, and accepts the entered selection. For example, a menu may be presented on the calling party's telephone display from which the calling party may make and enter selections. Alternatively, a voice prompting process may be utilized in which an announcement is played to the calling party requesting him to enter particular numbers for particular selections. For example if the called MS is inactive, the announcement may request the calling party to enter "1" if the calling party desires to call back the called MS at a later time. The calling party may be another MS, or may be a wireline telephone in a wireline network such as the Public Switched Telephone Network (PSTN).

FIG. 1 is a simplified block diagram of a radio telecommunications network that has been modified to implement the system of the present invention. A calling party utilizes MS-A 11 to access the network through a Mobile Switching Center (MSC-1) 12. A called party utilizes MS-B 13 to access the network through MSC-2 14. A HLR 15 maintains a subscriber database and information on the current status of each MS in its MS status database 16. For example, the MS status may indicate that the called MS-B is busy or inactive. The HLR also sets call flags 17 to indicate which calls are currently being monitored in order to implement the callback feature. A Service Control Point (SCP) 18 is connected to the HLR, and performs the Intelligent Network (IN) functions required to implement the callback feature. The SCP provides interactive voice prompting or menu selections to the calling party, and if the calling party chooses to be called back when the called party becomes active again, the SCP flags the call in the HLR. An option generator 19 initiates the interactive prompting to the calling party MS-A when it is reported by the HLR that the called party MS-B is inactive or busy. The option generator may send, for example, a menu of call handling options, or may initiate an announcement from MSC-1 to MS-A specifying the options available. When the calling party selects a call handling option, a selection controller 21 analyzes the selection and initiates the actions to carry it out. For example, if the calling party selects to be informed if the called party MS-B becomes active again within 30 minutes, the selection controller starts a timer 22 and sets a call flag 17 in the HLR. The SCP handles the timer function for queued calls, initiates the call connection if the called party becomes active and available, and initiates a call to the calling party when the timer expires without the called party becoming available.

After the specified time period, if the called MS-B is not active, the SCP 16 initiates a message to the calling party MS-A informing the calling party of this fact and providing the option at that time to continue with another time period or leave a voice mail message. If the called MS-B registers with the network before the time period expires, the HLR 15 reports the change of MS status to the SCP. A call setup controller 23 then sets up the call between MS-A and MS-B. The timer 22 and the call flag 17 are then reset.

Figure 2:
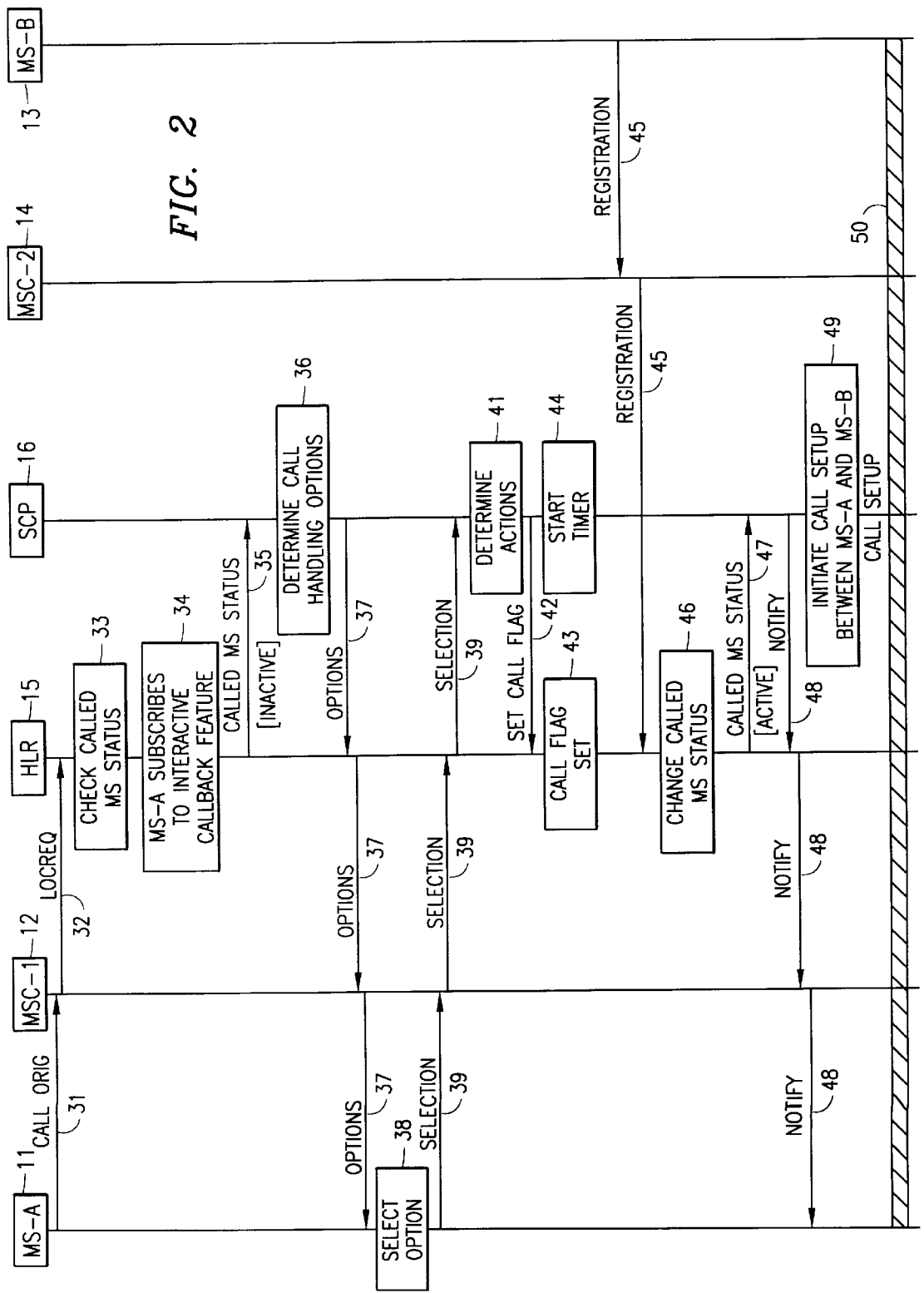
FIG. 2 is a message flow diagram of the messages sent between the nodes of the radio telecommunications network in the method of the present invention.

FIG. 2 is a message flow diagram of the messages sent between the nodes of the radio telecommunications network in the method of the present invention. At 31, a call origination directed to MS-B 13 is sent from MS-A 11 to MSC-1 12. MSC-1 sends a request for a routing number such as a Location Request (LOCREQ) Invoke message 32 to the HLR 15. At 33, the HLR checks the status of the called MS-B to determine whether it is available, busy, or inactive. If the called MS-B is available, the HLR obtains a routing number from MSC-2 14 and returns the routing number to MSC-1. If MS-B is busy or inactive, the HLR determines at 34 whether the calling party MS-A subscribes to the interactive callback feature of the present invention. The interactive callback feature of the present invention may be implemented globally for all MSs, or may be implemented on a per-subscriber basis as an optional feature. If the calling party MS-A does not subscribe to the interactive callback feature, and MS-B is busy, the calling subscriber either receives a busy signal, or the call is routed to voice mail, depending on whether the called party MS-B subscribes to voice mail. Likewise, if MS-A does not subscribe to the feature, and MS-B is inactive, MS-A receives an announcement that the called party is not available.

However, if MS-A subscribes to the interactive callback feature, and MS-B is either busy or inactive, the method moves to step 35 where the HLR sends the status of the called MS-B to the SCP 16. In the example shown, the status of MS-B is Inactive. At 36, the option generator 19 (FIG. 1) in the SCP determines the call handling options available when the called MS-B is Inactive. These options are sent at 37 to MS-A. As noted above, a menu may be presented on the calling party's MS display from which the calling party may make and enter selections. Alternatively, a voice prompting process may be utilized in which an announcement is played to the calling party requesting him to make particular entries for particular selections. At 38, the calling party enters a preferred selection, and at 39, the selection is returned to the SCP.

At step 41, the selection controller 21 in the SCP determines the actions required to execute the calling party's call handling selection. Although many scenarios are possible, as discussed above, FIG. 2 illustrates an example in which the calling party has selected to have the system call him back if the called MS-B becomes available within a selected time period such as 30 minutes. Therefore, at step 42, the SCP sends a message to the HLR instructing the HLR to set a call flag. The call flag is set at 43. The flag triggers call setup between MS-A and MS-B if MS-B is reactivated and registers with the network. At 44, the timer 22 is started and set for 30 minutes. If the timer expires, and the called MS is still not active, the SCP instructs the HLR to check the subscriber database and perform the function that has been specified for that calling party. For example, the subscriber may be removed from the queue, or the system may call the subscriber back and provide other options. In the latter case, the SCP initiates a call to MS-A with an announcement informing the calling party that the timer has expired, and providing the option at that time to continue with another time period or to record a voice mail message.

In the illustrated example, however, MS-B registers with the network at 45 before the timer expires. The registration is sent from the MSC-2 to the HLR where the status of the called MS-B is changed to Active at step 46. The new status is then sent to the SCP at 47. At step 48, MS-A is notified that MS-B is now available. At step 49, the call setup controller 23 in the SCP initiates call setup between MS-A and MS-B, and the call setup is completed at step 50.

It is thus believed that the operation and construction of the present invention will be apparent from the foregoing description. While the system and method shown and described has been characterized as being preferred, it will be readily apparent that various changes and modifications could be made therein without departing from the scope of the invention as defined in the following claims.

What is claimed is:

1. In a radio telecommunications network, a method of interactively providing a calling party with a choice of call handling options when a called mobile station (MS) is either busy or inactive, the method comprising the steps of:

receiving a call for the called MS in the network;

determining whether the called MS is inactive;

providing the calling party with a plurality of call handling options in a menu of call handling options which is displayed on the calling party's telephone display;

selecting, by the calling party, a call handling option from the plurality of call handling options;

determining actions required to execute the selected call handling option; and executing the determined actions.

2. In a radio telecommunications network, a method of interactively providing a calling party with a choice of call handling options when a called mobile station (MS) is inactive, the method comprising the steps of:

receiving a call for the called MS in the network;

determining whether the called MS is inactive;

providing the calling party with a plurality of call handling options;

selecting, by the calling party, a call handling option from the plurality of call handling options wherein the calling party selects an option instructing the network to automatically set up a call with the called MS when the called MS is reactivated;

determining actions required to execute the selected call handling option; and executing the determined actions, including:
      determining when the called MS registers with the network; and
      automatically initiating a call set-up between the calling party and the called MS, upon determining that the called MS registered with the network.

3. The method of interactively providing a calling party with a choice of call handling options of claim 2 wherein the step of automatically initiating a call setup is performed in a service control point (SCP).

4. In a radio telecommunications network, a method of interactively providing a calling party with a choice of call handling options when a called mobile station (MS) is inactive, the method comprising the steps of:

receiving a call for the called MS in the network;

determining whether the called MS is inactive;

providing the calling party with a plurality of call handling options;

selecting, by the calling party, a call handling option from the plurality of call handling options wherein the calling party selects an option instructing the network to automatically set up a call with the called MS if the called MS is reactivated within a specified time period;

determining actions required to execute the selected call handling option; and executing the determined actions, including:
      starting a timer to determine when the specified time period has expired;
      determining whether the called MS registered with the network;
      determining whether the specified time period had expired when the called MS registered; and
      automatically initiating a call set-up between the calling party and the called MS, if the called MS registered with the network before the time period expired.

5. In a radio telecommunications network having a home location register (HLR) and a service control point (SCP), a method of interactively providing a calling party with a choice of call handling options when a called mobile station (MS) is either busy or inactive, the method comprising the steps of:

receiving a call for the called MS in the network;

determining in the HLR a status of the called MS, the status indicating whether the called MS is inactive or busy;

generating in the SCP a plurality of call handling options based upon the determined status of the called MS;

providing the calling party with the plurality of call handling options, said providing step including the steps of:
      providing a first set of call handling options when the called MS is busy; and
      providing a second set of call handling options when the called MS is inactive;

selecting, by the calling party, a call handling option instructing the network to automatically set up a call with the called MS when the called MS is reactivated;

determining in the SCP actions required to execute the selected call handling option; and executing the determined actions said executing step including the steps of:
      determining when the called MS registers with the network; and
      automatically initiating a call setup between the calling party and the called MS, upon determining that the called MS registered with the network.

6. In a radio telecommunications network having a home location register (HLR) and a service control point (SCP), a method of interactively providing a calling party with a choice of call handling options when a called mobile station (MS) is either busy or inactive, the method comprising the steps of:

receiving a call for the called MS in the network;

determining in the HLR a status of the called MS, the status indicating whether the called MS is inactive or busy;

generating in the SCP a plurality of call handling options based upon the determined status of the called MS;

providing the calling party with the plurality of call handling options, said providing step including the steps of:

providing a first set of call handling options when the called MS is busy; and providing a second set of call handling options when the called MS is inactive;

selecting, by the calling party, a call handling option instructing the network to automatically set up a call with the called MS if the called MS is reactivated before a specified time period expires;

determining in the SCP actions required to execute the selected call handling option; and executing the determined actions said executing step including the steps of:

starting a timer to determine when the specified time period has expired;

determining whether the called MS registered with the network;

determining whether the specified time period had expired when the called MS registered; and automatically initiating a call setup between the calling party and the called MS, if the called MS registered with the network before the time period expired.

7. In a radio telecommunications network, a system for interactively providing a calling party with a choice of call handling options when a called mobile station (MS) is inactive, the system comprising:

a mobile switching centre (MSC) connecting the calling party to the network;

a home location register (HLR) connected to the MSC, said HLR including:

a subscriber database which indicates a status of the called MS;

means for sending the status of the called MS to a service control point (SCP); and means for flagging calls for special call handling treatment;

a service control point (SCP) connected to the HLR, said SCP including:

means for generating a plurality of call handling options in response to receiving the status of the called MS from the HLR, and sending the generated options to the calling party;

means for determining actions required to execute a call handling option selected by the calling party;

means for automatically setting up a call upon reception from the HLR of the message that the called MS has registered with the network;

a timer for measuring a time period specified by the calling party; and means for executing the determined actions.

* * * * *